United States Patent Office 2,929,720
Patented Mar. 22, 1960

2,929,720
HIGH VISCOSITY PLANT CELL SUSPENSIONS

Robert T. Whittenberger, Philadelphia, Pa., assignor to the United States of America as represented by the Secretary of Agriculture No Drawing. Application October 28, 1957
Serial No. 692,983

5 Claims. (Cl. 99—105)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to processes of treating plant cell suspensions, such as vegetable juices, to obtain high viscosity products. More particularly, food products of unusually high viscosities are obtained by removing certain substances, primarily water soluble electrolytes, from plant cell suspensions.

The above objective may be accomplished by different procedures. One procedure involves dispersing the plant cell suspension on a sieve and washing the plant particles retained on the sieve with water to remove the aqueous phase, the water soluble electrolytes being included with the aqueous phase. A sieve having openings in the range of 50–100 microns is adequate. Another procedure is to centrifuge the suspension. The water soluble electrolytes, as well as other water soluble substances, are included in the supernatant aqueous phase layer which is decanted from the remaining pulp. The plant pulp obtained in these procedures may be resuspended with distilled water to its original volume and a high viscosity product is obtained. It is also possible to remove water soluble electrolytes from the supernatant layer of a centrifuged plant cell suspension by adsorption on to a mixture of cation and anion exchange resins. Cation exchange resins are polymers containing phenolic, sulfonic, carboxylic, phosphonic acid groups as an integral portion of the resin, and an equivalent amount of cations. Anionic exchange resins are polymers containing amine groups as integral parts of the polymer lattice, and an equivalent amount of anions such as chloride, sulfate, hydroxyl, etc., ions. This supernatant layer now free of such water soluble electrolytes may then be used to resuspend the plant pulp and a high viscosity product is obtained.

Application of the present invention to single strength tomato juice for example provides a new means of increasing its viscosity. The result is a jell-like product which does not flow readily from a horizontal test tube, retains a heaped or mounded shape in a teaspoon, and is characterized by viscosities in the range of 600 to 1,000 cp. The products of this invention are valuable as food additives. They are especially important as blending agents and increasing viscosity in dietetic preparations where low-salt, low-calorie ingredients are required. Since the physical properties of the products are retained over a considerable range of pH, they can be used in food commodities such as salad dressings. Cooking does not reduce the viscosity of these food additives.

The various procedures are not only effective in themselves in increasing the viscosity of a plant cell suspension, but in certain instances, as revealed by data in the accompanying examples, the process of the invention accentuates the effect of a subsequent mechanical treatment, as that of homogenization.

EXAMPLE 1

A quantity of tomato juice with an initial viscosity value of 185 cp. was centrifuged until the mixture separated into a clear supernatant layer, representing about two-thirds of the original volume, and a pulp layer. The supernatant layer was carefully decanted so as not to lose any of the pulp, and to the pulp was added a volume of distilled water equal to that of the liquid decanted. The pulp and water were mixed and the mixture was centrifuged. This procedure was repeated 8 times, and resulted in the removal of water soluble substances from the juice. The final volume of pulp and water was equal to that of the original juice.

During the described treatment, viscosity of the sample increased from 185 cp. to a final value of 800 cp. The final product was a semi-solid rather than a liquid, although it contained only 0.8% by weight of total solids.

Homogenization of the final product caused no additional increase in viscosity.

EXAMPLE 2

A measured volume of tomato juice having a viscosity value of 185 cp. was poured onto a 200 mesh sieve (openings of 75 microns) and washed for 10 minutes with distilled water. This procedure removed water soluble substances and also some of the very small insoluble particles which could escape through the mesh of the sieve. The water insoluble solids which remained on the sieve had become swollen during the washing procedure. After draining for 3 minutes the solids were removed from the sieve with the aid of a spatula and a spoon. Their volume was equal to that of the original juice. The semi-solid product had a viscosity value of 1000 cp.

Homogenization of the product, as that obtained by 2 minutes in a Waring Blendor, caused no additional increase in viscosity.

EXAMPLE 3

Tomato juice with an initial viscosity of 200 cp. was centrifuged as in Example 1. This time the supernatant serum layer upon decantation was not discarded but was poured into a beaker containing a mixture of synthetic cation and anion exchange resins. The weight ratio of ion exchange resin to juice was about 1 to 5. After 15 minutes the serum was returned to the pulp, remixed, and centrifuged again. The procedure was repeated 7 times, each time establishing a new equilibrium of electrolytes with the pulp, and the net result was removal of a major quantity of electrolytes from the juice. The product, adjusted to the original volume, had a viscosity value of 230 cp.

Homogenization, as that achieved in 2 minutes in a Waring Blendor, gave a product with a viscosity value of 600 cp.

A similar homogenization of some of the original juice resulted in increasing the viscosity to 240 cp.

For ease of comparison the changes in viscosity in tomato juices as a result of the procedures described in these examples are presented in Table I.

Table I

[Viscosities of tomato juices before and after applying procedures of Examples 1, 2, and 3.]

| Example No. | Original Juice, cp. | Homogenized, cp. | Processed, cp. | Processed and Homogenized, cp. |
|---|---|---|---|---|
| 1 | 185 | 375 | 800 | 800 |
| 2 | 185 | 375 | 1,000 | 1,000 |
| 3 | 200 | 240 | 230 | 600 |

In the procedure of Example 3 changes in viscosity are attributed to the removal of electrolytes by the ion-exchange resins. Whereas homogenization of the original juice had the effect of increasing viscosity value from 200 cp. to 240 cp., roughly equivalent to the increase (to 230 cp.) obtained by the removal of electrolytes, subjecting the latter juice to homogenization had the startling effect of raising the viscosity to 600 cp. Hence, the removal of electrolytes not only caused a slight increase in viscosity at the time, but acted as a pre-conditioning treatment to accentuate the effects of physical agitation and dispersion.

A more complete removal of water soluble substances from the tomato juices appears to achieve viscosities approaching the maximum possible by any process, as homogenization of the products of Examples 2 and 3 did not change the viscosity values.

In practical application of the present invention a compromise would probably be effected between the viscosity desired and the economics of obtaining that viscosity. The procedure of Example 1 has an advantage over that of Example 2 in that the decanted portion, containing various food and flavor factors, could be conserved for other uses. In Example 3 most of the original food and flavor factors are retained in the de-ionized product.

The procedures described in Examples 1 to 3 were selected as those sufficient to achieve significant changes in viscosity of the subject juice, hence demonstrating the invention, and specific conditions such as temperature of the water, time of centrifuging, ratio of ion-exchange resin to juice and other variables may be varied over wide ranges before becoming limiting factors in the practice of the invention.

Also, depending upon the source of the tomato juice and the variations attendant upon the variety of tomato and the method of preparation of the juice, the specific conditions applied, especially as to number of replicatons of a particular process, had to be varied to achieve final products of comparable viscosity.

In addition to tomato juice, the nectars of apricot, peach and apple have been successfully modified by the procedures of Examples 1 and 2. Since the change in viscosity is attributed primarily to the response of cell walls to a decrease in electrolyte content, the procedures of this invention whereby this result is achieved are considered to have wide application to fruit and vegetable plant cell suspensions.

I claim:
1. A process for increasing the viscosity of a plant cell suspension comprising removing water soluble electrolytes from said suspension by centrifuging said suspension until the supernatant layer is a clear liquid, decanting said supernatant layer from the remaining pulp, stirring said supernatant layer with a mixture of ion-exchange resins thereby removing cations and anions from said supernatant layer, returning said supernatant layer to the plant pulp, resuspending said pulp in said supernatant layer, and homogenizing said resuspending pulp.

2. A process for increasing the viscosity of a plant cell suspension comprising removing the aqueous phase containing the water soluble electrolytes of the suspension from the remaining pulp, stirring such aqueous phase with a mixture of ion exchange resins thereby removing cations and anions therefrom, resuspending said pulp in the thus treated aqueous phase, and homogenizing said resuspended pulp.

3. A process for increasing the viscosity of a plant cell suspension comprising removing the aqueous phase containing the water soluble electrolytes of the suspension from the remaining pulp, stirring such aqueous phase with a mixture of ion exchange resins thereby removing cations and anions therefrom, and resuspending said pulp in the thus treated aqueous phase.

4. A process for increasing the viscosity of a plant cell suspension comprising removing the aqueous phase containing water soluble electrolytes of the suspension from the remaining pulp, removing the water soluble electrolytes from such aqueous phase, resuspending said pulp in the thus treated aqueous phase, and homogenizing said resuspended pulp.

5. A process for increasing the viscosity of a plant cell suspension comprising removing the aqueous phase containing water soluble electrolytes of the suspension from the remaining pulp, removing the water soluble electrolytes from such aqueous phase, and resuspending said pulp in the thus treated aqueous phase.

References Cited in the file of this patent
UNITED STATES PATENTS

| | | |
|---|---|---|
| 2,696,440 | Ball | Dec. 7, 1954 |
| 2,823,126 | Little | Feb. 11, 1958 |

OTHER REFERENCES

Food Technology, 1957, vol. XI, No. 1, pp. 19 to 22.